United States Patent Office 3,219,429
Patented Nov. 23, 1965

3,219,429
SPRAY DRIFT CORROSION INHIBITION IN SPRAYABLE HERBICIDES OF POLYCHLOROBENZOIC ACIDS
Harry C. Bucha, Wilmington, Del., and Martin L. Essick, Huntsville, Ala., assignors to E. I. du Pont de Nemours and Company, Wilmington, Del., a corporation of Delaware
No Drawing. Filed Jan. 10, 1963, Ser. No. 250,504
6 Claims. (Cl. 71—2.6)

This application is a continuation-in-part of copending application Serial No. 19,169, filed April 1, 1960, now abandoned.

This invention relates to herbicidal polychlorobenzoic acid compositions having highly reduced spray drift corrosion characteristics. More particularly, it relates to a process for the inhibition of spray drift corrosion when a herbicidally effective amount of polychlorobenzoic acid compounds is utilized in the presence of at least one of a narrow class of polyoxyethylene derivative compounds.

When an aqueous solution of water-soluble herbicidal polychlorobenzoic acid compounds was, prior to the present invention, sprayed onto undesired vegetation or used to prevent the growth of undesired plant lift, an undesirable type of corrosion occurred. This corrosion is caused by the herbicidal spray which inadvertently drifts against the spray equipment, trucks, compressors, pipes, booms, and other metal surfaces, especially steel, which may be exposed to the spray. The fine spray droplets form a thin film of the solution on the metal, and apparently due to the ready availability of oxygen from the air such a film is highly corrosive. For some unknown reason, conventional corrosion inhibitors admixed with the herbicidal composition have been ineffective and unsatisfactory is preventing this spray drift corrosion. The present invention solves this problem.

The compositions useful in this invention are single phase aqueous solutions having two essential components, as follows: (1) At least one herbicidal water-soluble polychlorobenzoic acid compound, and (2) a material selected from the group consisting of non-ionic, water-soluble polyoxyethylene derivative compounds which contain oxyethylene chains of from 8 to 40 oxyethylene units attached directly or through a polyhydric alcohol to the lipid-soluble portion of the polyoxyethylene derivative compound. Typical polyhydric alcohols include sorbitol, mannitol and glycerol, and typical lipid-soluble fractions of the polyoxyethylene derivative compounds are alkylated phenols, fatty acids, fatty alcohols and rosin acids.

The polyoxyethylene derivative compounds can most broadly be represented by the following structural formula:

$$R_mA[(CH_2CH_2O)pH]_n$$

where A is a polyhydric alcohol radical of from 2 to 6 hydroxyl groups such as ethylene glycol, glycerol, mannitol and sorbitol; R is the lipid-soluble portion of the compound which can be a fatty acid of 10 to 18 carbon atoms or a rosin acid. If A is derived from ethylene glycol R can additionally be an alkylated phenol with the alkyl radical being of 6 to 14 carbon atoms or an alkyl or fatty alcohol of from 10 to 18 carbon atoms, $m$ and $n$ are positive integers of 1 to 3 inclusive with the proviso that $m+n$ can be no greater than the number of hydroxyl groups in A and $p$ is a positive integer within the range of $8/n$ to $40/n$ or a total range of ethylene oxide units of 8 to 40.

If A in the above formula is ethylene glycol, the formula simplifies to:

R—(CH$_2$CH$_2$O)$_{p+1}$H

In this formula, the polyoxyethylene chain is attached directly to the lipid-soluble portion fo the molecule. However, if A is glycerol, sorbitol or mannitol, the polyoxyethylene chain or chains are attached to the lipidsoluble portion through the polyhydric alcohol.

Preferred subgeneric structures are:

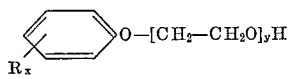

where R is alkyl which totals from 6 to 14 carbon atoms, $x$ is a positive integer of 1 to 3 inclusive and $y$ is a positive integer within the range of 8 to 40 or

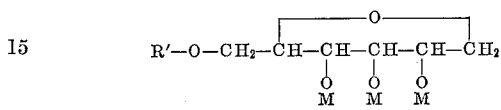

where R' is a fatty acid of from 10 to 18 carbon atoms and the M's are polyoxyethylene chains containing together 8 to 40 ethylene oxide units.

The herbicidal water-soluble polychlorobenzoic acid compounds, as used herein, means tri- and tetrachlorobenzoic acids, mixtures of these acids with a small amount of the di- and their herbicidally active water-soluble salts, such as the alkali metal salts including sodium, potassium and lithium salts, and also salts of organic bases, for example, ammonia, methylamine, dimethylamine, trimethylamine, ethanolamine, ethylamine, diethylamine and triethylamine.

The compounds can be conveniently represented by the following structural formula:

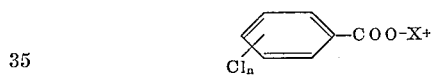

where $n$ is a positive integer from 3 to 4 both inclusive; and X is an alkali metal ion, ammonium ion, methylammonium ion, dimethylammonium ion, trimethylammonium ion, or monoethanolammonium ion.

These compounds are all prepared by conventional means. For example, the trichlorobenzoic acids can be prepared by the routes described in the Journal of the Chemical Society, vol. 79, pages 43 through 49 (1901), and the Journal of the Chemical Society, vol. 81, page 1332 (1903). The compound 2,3,5-trichlorobenzoic acid is prepared from 2,3,5-trichloroaniline by first preparing 2,3,5-trichlorobenzonitrile; this is then hydrolyzed to form 2,3,5-trichlorobenzamide, which in turn is hydrolyzed to form 2,3,5-trichlorobenzoic acid. The compound 2,3,6-trichlorobenzoic acid, is prepared by the oxidation with concentrated nitric acid of 2,3,6-trichlorotoluene, obtained by the direct chlorination of toluene. The compound 2,4,6-trichlorobenzoic acid is similarly obtained from 2,4,6-trichlorotoluene.

Also, 2,3,5,6-tetrachlorobenzoic acid is prepared by nitrating 2,3,6-trichlorobenzoic acid in aqueous sulfuric-nitric acid mixture to produce 2,3,6-trichloro-5-nitrobenzoic acid, which precipitates and can be separated easily. This compound is then reduced with hydrochloric acid in the presence of iron to give 2,3,6-trichloro-5-aminobenzoic acid. This is then dissolved in concentrated hydrochloric acid and diazotized by adding sodium nitrite. The solution of the diazo compound is added to a solution of cuprous chloride and concentrated hydrochloric acid, and upon cooling of this mixture, substantially pure 2,3,5,6-tetrachlorobenzoic acid precipitates.

The 2,3,4,6-substituted acid can be prepared by the same synthesis but starting with the 2,4,6-isomer instead of 2,3,6-trichlorobenzoic acid.

The amine salts of polychlorobenzoic acids can be prepared by conventional means. For example, they can be prepared by reacting in alcoholic solution equimolar amounts of a polychlorobenzoic acid and the particular amine, evaporating the solvent and recovering the dried salt. Alternatively, a concentrated aqueous solution can be made by adding the amine to an aqueous suspension of a polychlorobenzoic acid or mixture of polychlorobenzoic acids in a system provided with good agitation.

The alkali metal salts can similarly be prepared by slurrying the chlorobenzoic acid in water, neutralizing the acid with an alkali metal hydroxide, such as sodium hydroxide, and if desired drying the mixture.

In the present invention, mixtures of these polychlorobenzoic acid compounds are preferred. Preferred mixtures are those containing a high percentage of 2,3,6-trichlorobenzoic acid or 2,3,5,6-tetrachlorobenzoic acid. The most preferred mixture consists of at least 60% of 2,3,6-trichlorobenzoic acid, a maximum of 3% tetrachlorobenzoic acids, a maximum of 2% dichlorobenzoic acids, the remainder being other isomers of trichlorobenzoic acids.

Representative of the non-ionic water-soluble polyoxyethylene derivative compounds required as the second essential component of the compositions of this invention can be mentioned the following:

Polyoxyethylene sorbitan monolaurates
Nonylphenoxypolyoxyethylene ethanols
Polyoxyethylene lauryl ethers
Polyoxyethylene stearates
Polyoxyethylene oleates
Polyoxyethylene laurates
Polyoxyethylene mannitol monostearates
Polyoxyethylene sorbitan monostearates
Polyoxyethylene sorbitan monooleates
Polyoxyethylene sorbitan trioleates
Polyoxyethylene palmitates
Dodecyl phenoxy polyoxyethylene ethanols
Polyoxyethylene stearyl ethers
Polyoxyethylene glycerol monolaurates
Polyoxyethylene glycerol monooleates
Polyoxyethylene glycerol dioleates
Polyoxyethylene glycerol monostearates
Reaction products of ethylene oxide with mixed fatty acids derived from coconut oil
Reaction products of ethylene oxide with fatty acids derived from beef tallow
Reaction products of ethylene oxide with tall oil It is, of course, obvious that in all of the above representative compounds that different products are obtained if the number of ethylene oxide units is varied. The most preferred of these materials is a polyoxyethylene sorbitan monolaurate identified as "Tween" 20 which has 20 ethylene oxide units and is available from the Atlas Powder Company.

Generally speaking, a broad class of polyoxyethylene compounds are known as emulsifying agents, and therefore useful in compositions of two phases or more. Since the compositions of the present invention are strictly single phase aqueous solutions, prior to the present invention no reason would have been speculated for adding an emulsifying agent to a single phase system.

It is therefore considered completely unexpected and surprising that the very narrow class of polyoxyethylene compounds, limited to those which contain oxyethylene chains of from 8 to 40 oxyethylene units attached directly or through a polyhydric alcohol to the lipid-soluble portion of the compound, would provide with the herbicidal water-soluble polychlorobenzoic acid compounds referred to above a highly useful herbicidal composition which deters or prevents completely the highly objectionable spray drift corrosion properties of prior art polychlorobenzoic acid compositions.

The advantage of the present invention is even more particularly surprising since an extremely large number of tests using ordinary corrosion inhibitors have proven that ordinary corrosion inhibitors do not inhibit the subject spray drift corrosion problem to any significant extent, whereas the compositions of the present invention are highly effective.

At the same time, it has been found that the polyoxyethylene derivatives are not inhibitors for the conventional types of corrosion, such as corrosion of containers or spray tanks, where the product is not extended in a thin film in intimate contact with air.

The polyoxyethylene essential ingredient of the compositions of this invention will be used in concentrations of from about 1 to 12 parts of polyoxyethylene compound per 100 parts of polychlorobenzoic acid compound expressed as acid equivalent. A particularly preferred range is from 2 to 6 parts of polyoxyethylene compound per 100 parts of polychlorobenzoic acid compounds because of the outstanding effectiveness in preventing spray drift corrosion.

The two essential components of the compositions of the present invention are conveniently formulated for sale as an aqueous solution ranging from about 1 to 6 pounds of polychlorobenzoic acid equivalent per gallon of formulation. This formulation can be conveniently diluted for use to concentrations ranging from 1 to 100 pounds per 100 gallons of spray. It is the diluted spray which is protected against causing spray drift corrosion by use of the polyoxyethylene derivative described above.

A highly preferred adjuvant in the compositions of the present invention, because of the remarkably superior handling and application properties, is a partially desulfonated sodium lignin sulfonate, such as "Marasperse" CB or "Marasperse" N sold by Marathon Corporation. The sodium lignin sulfonate which has been 10 to 90% desulfonated will be used in an amount of 0.5 to 5 parts per 100 parts of polychlorobenzoic acid compound expressed as acid equivalent. The sulfonate adjuvant is especially preferred because it prevents the precipitation of calcium and magnesium salts when the chlorobenzoic acid compositions are diluted with "hard" water containing soluble calcium and magnesium salts.

The process of the present invention is utilized by using the compositions in accordance with customary practice well understood in the art. The diluted solution described above can be applied conveniently by spraying to weeds, brush, undergrowth, soil, and other such areas as may be desired for the control or prevention of plant growth. The dilute compositions will be used in conventional quantities, i.e., in sufficient quantity to control or prevent plant growth by applying sufficient compositions to provide from about 0.25 to 100 pounds of herbicidally active polychlorobenzoic acid compound per acre.

The outsanding advantage of the present invention lies in the prevention of corrosion for an extended period of a surface of a ferrous metal, especially mild steel, upon which the polychlorobenzoic acid herbicidal spray might drift, settle, or be spilled. Conventional inhibitors neither prevent such corrosion nor delay it for any significant time.

The compositions useful in the present invention preferably contain other ingredients. For example, it is preferred that the compositions contain suitable anti-foam agents such as silicone oil anti-foam materials. Suitable ones include: "Silicone Antifoam 60" of the General Electric Company and "Antifoam A" Emulsion of Dow-Corning. An optional additive includes water-soluble anionic dyes such as Orange G (Colour Index No. 27) and "Pontacyl" AS Extra Conc. (Colour Index No. 176). Conventional corrosion inhibitors useful in preventing corrosion of storage tanks, handling equipment and the like, such as benzoates, nitrites, nitrates, and other commercially available corrosion inhibiting formulations are present in the preferred composition; and hard water stabilizers and chelating agents. These additives will of course be chosen with due regard for compatibility and stability of herbicidal effectiveness as is customary with experts in this art.

A particularly preferred composition for use in the present invention consists essentially of 100 parts expressed as acid equivalent of a polychlorobenzoic acid mixture of at least 60% 2,3,6-trichlorobenzoic acid, a maximum of 3% tetrachlorobenzoic acid, a maximum of 2% dichlorobenzoic acid and the remainder being other isomers of trichlorobenzoic acids, these acids being used in the form of their dimethylammonium salts; about 2 parts of polyoxyethylene sorbitan monolaurate, about 2 parts of partially desulfonated sodium lignin sulfonate, about 6 to 7 parts of sodium benzoate, about 1 part of sodium nitrite, and about 0.2 part of a silicone antifoam, admixed in solution with about 300 parts of water for a concentrated formulation, or with about 3,000 parts of water for a dilute spray for application. In some applications, the benzoate and nitrite are advantageously omitted.

This invention will be explained more fully by the following examples, in addition to those set forth above, which are intended only for purposes of illustration and not limitation.

*Example I*

A solution in water of dimethylammonium 2,3,6-trichlorobenzoate (2 pounds of acid equivalent per gallon of water) containing 4 parts of the reaction product of, on the average, 20 mols of ethylene oxide per mol of sorbitan monolaurate ("Tween" 20, a product of the Atlas Powder Co.), per 100 parts of acid equivalent is diluted using 1 part solution to 9 parts water. A thin film of this solution is applied to a No. 1020 mild steel sheet which is held at conditions of high (88%) relative humidity and 25° C. temperature. The steel sheet does not exhibit any corrosion for an extended period of at least 20 days.

*Example II*

A solution in water of the dimethylamine salts of a polychlorobenzoic acid mixture comprising 42% tetrachlorobenzoic acids, 31.7% trichlorobenzoic acids, and 26.3% other polychlorobenzoic acids (4 pounds of acid equivalent per gallon of water) containing approximately two parts of partially desulfonated sodium lignin sulfonate ("Marasperse" CB, a product of the Marathon Corporation) and two parts of nonylphenoxy polyethylene ethanol containing 88% oxyethylene units ("Igepal" CO-880, a product of General Aniline and Film Corp.) per 100 parts of acid equivalent is diluted one part in nine parts of water. A thin film of this dilute solution is spread on a mild steel surface under humid conditions (88% realtive humidity) at room temperature. No corrosion is apparent after approximately 25 days.

*Example III*

A dilute aqueous spray solution containing 50 pounds of acid equivalent of sodium polychlorobenzoate herbicide per 100 gallons of water, 2.5 pounds of nonylphenoxy-polyoxyethylene ethanol containing 63% oxyethylene units ("Igepal" CO-630, a product of General Aniline and Film Corp.) 0.1 pound of silicon antifoam agent (General Electric Co. Antifoam 60), and 1.25 pounds of a partially desulfonated sodium ligno sulfonate ("Marasperse" N, a product of Marathon Corporation) is applied in a thin film to the surface of a piece of steel, which is placed in a desiccator at 88% relative humidity and 25 °C. Three weeks later there is no significant corrosion.

*Example IV*

A solution as in Example I is prepared except that "Igepal" CO-850, a product of General Aniline and Film Corp. (nonylphenoxy polyoxyethylene ethanol containing 85% oxyethylene units) is substituted for the "Tween" 20. This solution shows no more corrosion after 20 days storage at high humidity (88% relative humidity) on a mild steel surface than does a similarly prepared coupon that has had no solution applied to it.

*Example V*

A No. 1020 mild carbon steel surface, treated as in Example 2 excepting that the "Igepal" CO-880 is replaced by polyoxyethylene sorbitan trioleate ("Tween" 85 a product of the Atlas Powder Co.), shows no corrosion after 20 days.

*Example VI*

A two pound (acid equivalent) per gallon solution in water of dimethylamine salts of a polychlorobenzoic acid mixture containing 60% 2,3,6-trichlorobenzoic acid, 35% other trichlororbenzoic acid isomers, and 5% other polychlorobenzoic acid isomers is formulated using the following:

26.1% polychlorobenzoic acids, dimethylammonium salts
1% polyoxyethylene sorbitan monolaurate ("Tween" 20)
0.5% partially desulfonated sodium lignin sulfonate ("Marasperse" CB)
0.05% GE-60 silicone antifoam
1.5% sodium benzoate
0.2% sodium nitrite
70.65% water Diluting the above solution with 10 parts of water gives a solution which does not corrode steel for 45 days in the spray drift corrosion test of Example I. This formulation also has the following properties:

(1) Corrosion of fully immersed test strips of 1020 steel _____ Less than 1 mil per year.
(2) Hard water stability __ Remains clear when diluted with 1000 parts per million of hard water.
(3) Foam tendency _____ Does not foam excessively either as described above or when diluted with 10 parts of water.
(4) Freeze stability _____ Less than 0.05% undissolved solvents remained after freezing, followed by thawing at 10° C.

A similar formulation, but without the "Tween" 20, shows spray drift corrosion after only about 5 days or less.

*Eample VII*

An aqueous solution of 26.1% of the dimethylamine salts of a polychlorobenzoic acid mixture, containing 60% 2,3,6-trichlorobenzoic acid and 40% other polychlorobenzoic acids, and 1% of a nonylphenoxy polyoxyethylene ethanol containing 88% oxyethylene units is diluted with 10 parts of water. A thin film of this solution placed on a 1020 mild steel surface does not cause corrosion for at least 20 days in the spray drift corrosion test of Example I. A similar solution not containing the nonylphenoxy polyoxyethylene ethanol shows severe corrosion in as early at five to eight days.

*Example VIII*

The solution in Example VI containing in addition to the adjuvants named 1% of the dye "Du Pont Orange G" (Colour Index No. 27) does not show spray drift corrosion for at least 25 days in the spray drift corrosion test of Example I.

*Example IX*

A solution as prepared in Example VI excepting that the sodium benzoate and sodium nitrite are omitted, when placed in a thin film on a 1020 mild steel surface in a humid (88% relative humidity) atmosphere at 25° C., does not show spray drift corrosion for at least 25 days.

Example X

The concentrated solutions of the preceding examples are diluted with 9 gallons of water per gallon of concentrated solution and are applied, at a rate to provide from 0.5 to 100 pounds of active herbicidal ingredient per acre, to railroad rights of way with excellent control of undesired vegetation, such as woody vines, and substantial absence of concurrent corrosion effect on metal in the vicinity.

What is claimed is:

1. A process for the inhibition of spray drift corrosion when a herbicidally effective amount of a water-soluble polychlorobenzoic acid compound mixture of the structural formula:

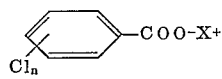

wherein $n$ is a positive integer of from 3 to 4 inclusive and X is selected from the group consisting of an alkali metal ion, ammonium ion, methylammonium ion, dimethylammonium ion, trimethylammonium ion and monoethanolammonium ion, is utilized as a sprayable herbicide comprising: applying said mixture in the presence of 1 to 12 parts by weight of a non-ionic water-soluble polyoxyethylene derivative compound per 100 parts by weight of the polychlorobenzoic acid, the polyoxyethylene derivative compound containing oxyethylene chains of from 8 to 40 oxyethylene units attached through a polyhydric alcohol selected from the group consisting of sorbitol, mannitol and glycerol to the lipid-soluble portion of the polyoxyethylene derivative compound and in which said lipid-soluble portion is selected from the group consisting of fatty acids and rosin acids.

2. The process of claim 1 wherein said polyoxyethylene derivative compound is polyethylene sorbitan monolaurate.

3. The process of claim 2 wherein said polychlorobenzoic acid compound mixture consists essentially of 60% 2,3,6-trichlorobenzoic acid, a maximum of 3% tetrachlorobenzoic acid and a maximum of 2% dichlorobenzoic acid and the remainder being other isomers of trichlorobenzoic acids, said acids being present in the form of their dimethylammonium salts.

4. A process for the inhibition of spray drift corrosion when a herbicidally effective amount of a water-soluble polychlorobenzoic acid compound mixture of the structural formula:

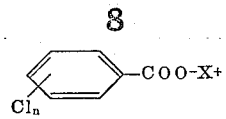

wherein $n$ is a positive integer of from 3 to 4 inclusive and X is selected from the group consisting of an alkali metal ion, ammonium ion, methylammonium ion, dimethylammonium ion, trimethylammonium ion and monoethanolammonium ion, is utilized as a sprayable herbicide comprising; applying said mixture in the presence of 1 to 12 parts by weight of a non-ionic, water-soluble polyoxyethylene derivative compound per 100 parts by weight of the polychlorobenzoic acid, the polyoxyethylene derivative compound containing an oxyethylene chain of from 8 to 40 oxyethylene units attached directly to the lipid-soluble portion of the polyoxyethylene derivative compound and in which said lipid-soluble portion is selected from the group consisting of alkylated phenols, fatty acids, fatty alcohols and rosin acids.

5. The process of claim 4 wherein the polyoxyethylene derivative compound is nonylphenoxy polyoxyethylene ethanol.

6. A process for the inhibition of spray drift corrosion when a herbicidally effective amount of 100 parts expressed as acid equivalent of a water-soluble polychlorobenzoic acid compound mixture of at least 60% 2,3,6-trichlorobenzoic acid, a maximum of 3% tetrachlorobenzoic acid, a maximum of 2% dichlorobenzoic acid and the remainder being other isomers of trichlorobenzoic acids, these acids being present in the form of their dimethylammonium salts is utilized as a sprayable herbicide comprising: applying said mixture in the presence of about 4 to 5 parts by weight of polyoxyethylene sorbitan monolaurate; about 2 parts by weight of partially desulfonated sodium lignin sulfonate; about 6 to 7 parts by weight of sodium benzoate; about 1 part by weight of sodium nitrite, and about 0.2 part by weight of a silicone antifoam admixed in solution in about 300 parts by weight of water to make a concentrated formulation.

References Cited by the Examiner
UNITED STATES PATENTS

| | | |
|---|---|---|
| 2,946,721 | 7/1960 | Hyatt et al. |
| 3,013,873 | 12/1961 | Hart et al. _____ 71—2.6 |
| 3,014,965 | 12/1961 | Newcomer et al. ___ 71—2.6 XR |
| 3,060,084 | 10/1962 | Littler. |
| 3,081,162 | 3/1963 | Tischler _____ 71—2.6 |
| 3,096,367 | 7/1963 | Newcomer _____ 71—2.6 XR |

LEWIS GOTTS, *Primary Examiner.*